United States Patent
Li et al.

(10) Patent No.: US 9,836,852 B2
(45) Date of Patent: Dec. 5, 2017

(54) SYSTEM AND METHOD TO STABILIZE DISPLAY OF AN OBJECT TRACKING BOX

(71) Applicant: QUALCOMM Incorporated, San Diego, CA (US)

(72) Inventors: Christopher Li, Mountain View, CA (US); Xin Zhong, San Diego, CA (US); Dashan Gao, San Diego, CA (US); Yingyong Qi, San Diego, CA (US); Kai Guo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 14/567,119

(22) Filed: Dec. 11, 2014

(65) Prior Publication Data
US 2015/0178943 A1     Jun. 25, 2015

Related U.S. Application Data

(60) Provisional application No. 61/919,754, filed on Dec. 21, 2013.

(51) Int. Cl.
*G06K 9/00* (2006.01)
*G06T 7/20* (2017.01)
(Continued)

(52) U.S. Cl.
CPC ........ *G06T 7/2026* (2013.01); *G06K 9/00624* (2013.01); *G06K 9/4647* (2013.01);
(Continued)

(58) Field of Classification Search
None
See application file for complete search history.

(56) References Cited

U.S. PATENT DOCUMENTS

2010/0033579 A1*   2/2010   Yokohata ............... G03B 15/00
                                                         348/169
2010/0073502 A1    3/2010   An et al.
(Continued)

FOREIGN PATENT DOCUMENTS

WO       2007077283 A1    7/2007

OTHER PUBLICATIONS

International Search Report and Written Opinion for International Application No. PCT/US2014/070078, ISA/EPO, dated Mar. 9, 2015, 10 pages.

*Primary Examiner* — Matthew Bella
*Assistant Examiner* — Jose M Torres
(74) *Attorney, Agent, or Firm* — Toler Law Group, PC (57) ABSTRACT

A method includes receiving first data defining a first bounding box for a first image of a sequence of images. The first bounding box corresponds to a region of interest including a tracked object. The method also includes receiving object tracking data for a second image of the sequence of images, the object tracking data defining a second bounding box. The second bounding box corresponds to the region of interest including the tracked object in the second image. The method further includes determining a similarity metric for first pixels within the first bounding box and search pixels within each of multiple search bounding boxes. Search coordinates of each of the search bounding boxes correspond to second coordinates of the second bounding box shifted in one or more directions. The method also includes determining a modified second bounding box based on the similarity metric.

30 Claims, 7 Drawing Sheets

(51) Int. Cl.
   *G06T 7/223*   (2017.01)
   *G06K 9/46*    (2006.01)
   *H04N 5/232*   (2006.01)
   *G06T 7/246*   (2017.01)
   *G06K 9/62*    (2006.01)

(52) U.S. Cl.
   CPC ............. *G06T 7/20* (2013.01); *G06T 7/223* (2017.01); *G06T 7/246* (2017.01); *H04N 5/232* (2013.01); *G06K 9/6202* (2013.01); *G06T 2207/10004* (2013.01); *G06T 2207/20021* (2013.01); *G06T 2207/30241* (2013.01); *G06T 2210/12* (2013.01)

(56) References Cited

U.S. PATENT DOCUMENTS

| | | | |
|---|---|---|---|
| 2011/0188758 A1 | 8/2011 | Kinoshita et al. | |
| 2011/0249889 A1* | 10/2011 | Kothandaraman | G06T 7/0026 382/154 |
| 2014/0133703 A1* | 5/2014 | Dogra | G06T 7/2026 382/103 |
| 2015/0063628 A1* | 3/2015 | Bernal | G06K 9/00771 382/103 |

* cited by examiner

SYSTEM AND METHOD TO STABILIZE DISPLAY OF AN OBJECT TRACKING BOX

I. CLAIM OF PRIORITY

This application claims priority from U.S. Provisional Patent Application No. 61/919,754 filed on Dec. 21, 2013, and entitled "SYSTEM AND METHOD TO STABILIZE DISPLAY OF AN OBJECT TRACKING BOX," the contents of which are incorporated herein in their entirety.

II. FIELD

The present disclosure is generally related to stabilizing display of an object tracking box.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as a wireless telephone, may include a camera. The camera may capture a sequence of images that a user may view in a camera display. The user may select an arbitrary object in an image by selecting a region of the camera display. A tracking algorithm may track the object's motion over subsequent images and may display a box over the tracked object on the camera display. The displayed box may appear unstable due to rapid changes in a location and/or a size of the box between the images. For example, the user may be holding the wireless telephone in a way that shakes the camera. As another example, the object may move with a high amount of displacement between images.

IV. SUMMARY

Systems and methods of stabilizing display of an object tracking box are disclosed. A user may select an object in an image by selecting a region (e.g., a square or a rectangle) of a camera display in which the image is displayed. The camera display may show a bounding box surrounding the selected object. The object, the camera, or both, may be moving while the sequence of images is captured. A tracker may update coordinates and/or dimensions of the bounding box such that the bounding box approximately tracks the object over subsequent images. Updating the coordinates and/or dimensions may result in the bounding box appearing to "jump" from one image to another. A stabilizer may "smooth" the display of the bounding box (e.g., reduce jitter) from a first image to a subsequent image. For example, the stabilizer may receive first coordinates of a first bounding box corresponding to the first image and may receive updated coordinates (e.g., second coordinates) of a second bounding box corresponding to the subsequent image from the tracker. The stabilizer may determine a search region around the second bounding box and may determine multiple search bounding boxes corresponding to the search region. Each of the search bounding boxes may correspond to a candidate bounding box to replace the second bounding box to reduce jitter. The stabilizer may compare search pixels of each of the search bounding boxes to first pixels of the first bounding box to select a particular search bounding box that is most similar to the first bounding box based on a similarity metric. The stabilizer may replace the second bounding box with the selected search bounding box, which reduces visual jitter associated with the display of boundary boxes in a sequence of images.

In a particular aspect, a method includes receiving first data defining a first bounding box for a first image of a sequence of images. The first bounding box corresponds to a region of interest including a tracked object. The method also includes receiving object tracking data for a second image of the sequence of images, the object tracking data defining a second bounding box. The second bounding box corresponds to the region of interest including the tracked object in the second image. The method further includes determining a similarity metric for first pixels within the first bounding box and search pixels within each of multiple search bounding boxes. Search coordinates of each of the search bounding boxes correspond to second coordinates of the second bounding box shifted in one or more directions. The method also includes determining a modified second bounding box based on the similarity metric.

In another particular aspect, an apparatus includes a memory and a processor. The memory is configured to store instructions. The processor is configured to execute the instructions to determine a similarity metric for first pixels within a first bounding box of a first image and search pixels within each of multiple search bounding boxes. The first bounding box corresponds to a region of interest including a tracked object. Search coordinates of each of the search bounding boxes correspond to second coordinates of a second bounding box shifted in one or more directions. The first image precedes a second image in a sequence of images. The second bounding box corresponds to the region of interest including the tracked object in the second image. The processor is also configured to execute the instructions to determine a modified second bounding box based on the similarity metric.

In another particular aspect, a computer-readable storage device stores instructions that, when executed by a processor, cause the processor to perform operations including determining a similarity metric for first pixels within a first bounding box of a first image and search pixels within each of multiple search bounding boxes. The first bounding box corresponds to a region of interest including a tracked object. Search coordinates of each of the search bounding boxes correspond to second coordinates of a second bounding box shifted in one or more directions. The first image precedes a second image in a sequence of images. The second bounding box corresponds to the region of interest including the tracked object in the second image. The operations also include determining a modified second bounding box based on the similarity metric.

One particular advantage provided is that an object tracking box (e.g., the bounding box) is stabilized from one image to another in a sequence of images. For example, coordinates of a bounding box may be modified to generate a modified bounding box such that pixels within the modified bounding box are more similar to pixels within a preceding bounding box of a preceding image. As another example, a modified size (e.g., dimensions) of the bounding box may correspond to median dimensions of a plurality of preceding images. Other aspects, advantages, and features of the present disclosure will become apparent after review of the entire application, including the following sections: Brief Description of the Drawings, Detailed Description, and the Claims.

VI. DETAILED DESCRIPTION

Figure 1:
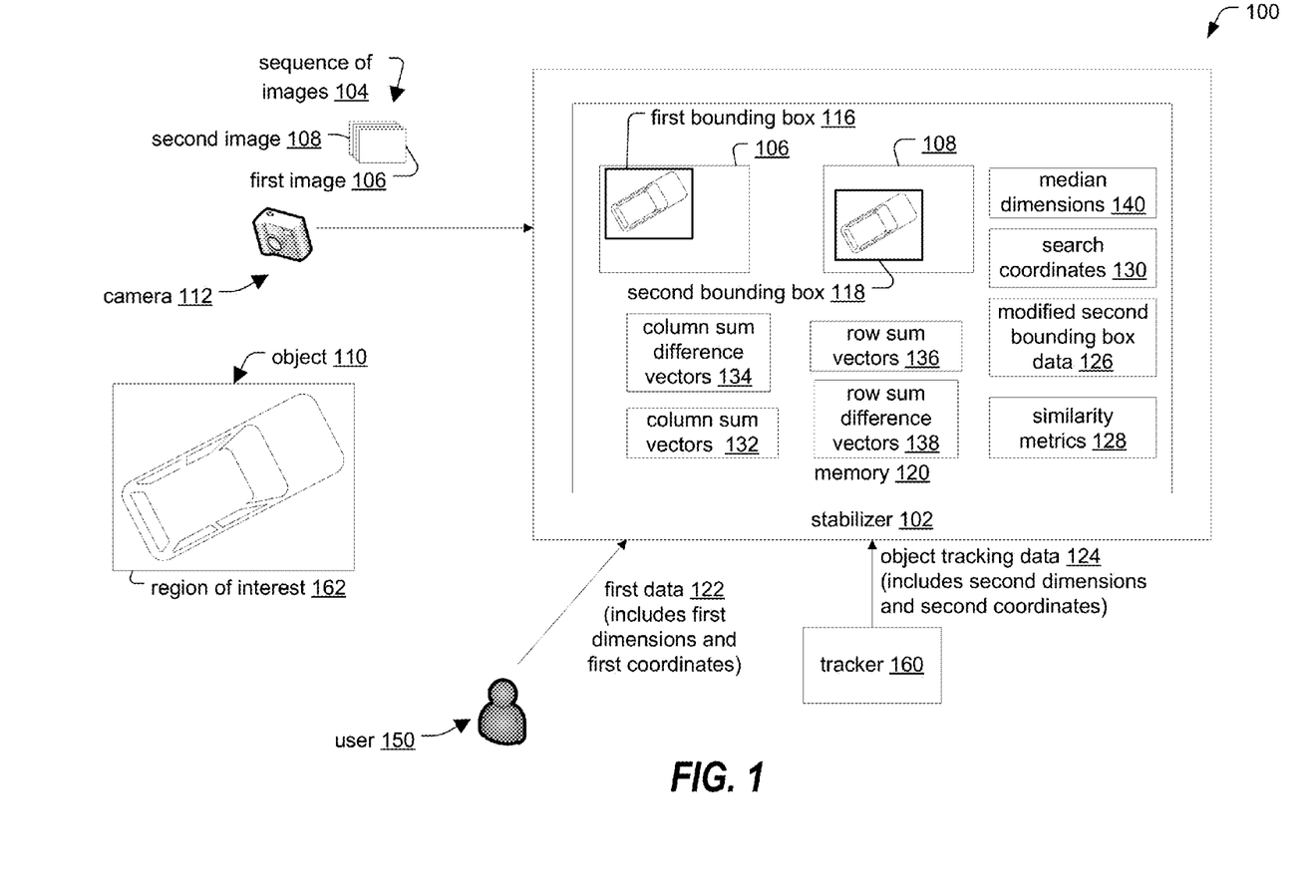
FIG. 1 is a block diagram of a particular illustrative embodiment of a system that is operable to stabilize display of an object tracking box.

Referring to FIG. 1, a particular illustrative embodiment of a system operable to stabilize display of an object tracking box is disclosed and generally designated 100. The system 100 includes a stabilizer 102 coupled to a camera 112 and to a tracker 160. The stabilizer 102 may include a memory 120. In a particular embodiment, one or more components of the system 100 may be integrated into a mobile phone, a set top box, a music player, a video player, an entertainment unit, a navigation device, a communications device, a personal digital assistant (PDA), a fixed location data unit, a computer, or a combination thereof.

It should be noted that in the following description, various functions performed by the system 100 of FIG. 1 are described as being performed by certain components or modules. However, this division of components and modules is for illustration only. In an alternate embodiment, a function performed by a particular component or module may be divided amongst multiple components or modules. Moreover, in an alternate embodiment, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

During operation, the camera 112 may capture a sequence of images 104. In a particular embodiment, the sequence of images 104 may correspond to a video stream that a user is recording (e.g., storing in memory). In another embodiment, the sequence of images 104 may correspond to image data displayed by a camera display (e.g., corresponding to a viewfinder display) over a time period. For example, the user may view the image data and subsequently take a picture (e.g., store a particular image in memory).

The sequence of images 104 may include a first image 106. The first image 106 may be displayed to a user 150 via a camera display (not shown). The user 150 may select an object 110 (e.g., a car in FIG. 1) displayed in the camera display by selecting a region of interest 162 in the first image 106. The region of interest 162 may include the object 110. The stabilizer 102 may receive first data 122 from the user 150 defining a first bounding box 116 corresponding to the region of interest 162. For example, the first data 122 may include first coordinates (e.g., a horizontal axis (x-axis) coordinate and a vertical axis (y-axis) coordinate) of the first bounding box 116 in the first image 106. In a particular embodiment, the first coordinates may correspond to a top-left corner of the first bounding box 116 in the first image 106. The first data 122 may also include first dimensions of the first bounding box 116. For example, the first data may include a width (e.g., along the x-axis of the first image 106) and a height (e.g., along the y-axis of the first image 106) of the first bounding box 116. In this example, the first bounding box 116 may correspond to a square or a rectangle.

The sequence of images 104 may include a second image 108. The second image 108 may also include (e.g., depict) the region of interest 162 including the object 110. The tracker 160 may generate object tracking data 124 defining an object tracking box (e.g., a second bounding box 118). The second bounding box 118 may correspond to the region of interest 162 in the second image 108. For example, the object tracking data 124 may include second coordinates (e.g., an x-axis coordinate and a y-axis coordinate) of the second bounding box 118 in the second image 108. In a particular embodiment, the second coordinates correspond to a top-left corner of the second bounding box 118 in the second image 108. The object tracking data 124 may also include second dimensions of the second bounding box 118. For example, the object tracking data 124 may include a width (e.g., along the x-axis of the second image 108) and a height (e.g., along the y-axis of the second image 108) of the second bounding box 118.

The stabilizer 102 may determine a search region for the second image 108 based on the second bounding box 118. For example, the search region may include pixels within the second bounding box 118 and pixels substantially near the second bounding box 118, as described with reference to FIG. 4. The stabilizer 102 may determine a plurality of search bounding boxes within the search region, as described with reference to FIG. 4. For example, coordinates of each of the search bounding boxes may correspond to the second coordinates of the second bounding box 118 shifted in one or more directions. Each of the search bounding boxes may correspond to a candidate bounding box to replace the second bounding box 118, when displaying the second image 108, to reduce jitter. The stabilizer 102 may store search coordinates 130 of the search bounding boxes in the memory 120. Dimensions of each of the search bounding boxes may correspond to the first dimensions of the first bounding box 116.

The stabilizer 102 may determine a similarity metric for first pixels within the first bounding box 116 and search pixels within each of the search bounding boxes. For example, the similarity metric may include a sum of absolute differences (SAD) metric. To illustrate, the stabilizer 102 may calculate a particular similarity metric for the first pixels and candidate search pixels within a candidate search bounding box based at least in part on a SAD of first pixel characteristics (e.g., a pixel intensity, a pixel color (e.g., red, green, blue, cyan, magenta, yellow, or black) sub-component, or a combination thereof) corresponding to the first pixels and second pixel characteristics corresponding to the candidate search pixels.

Figure 2:
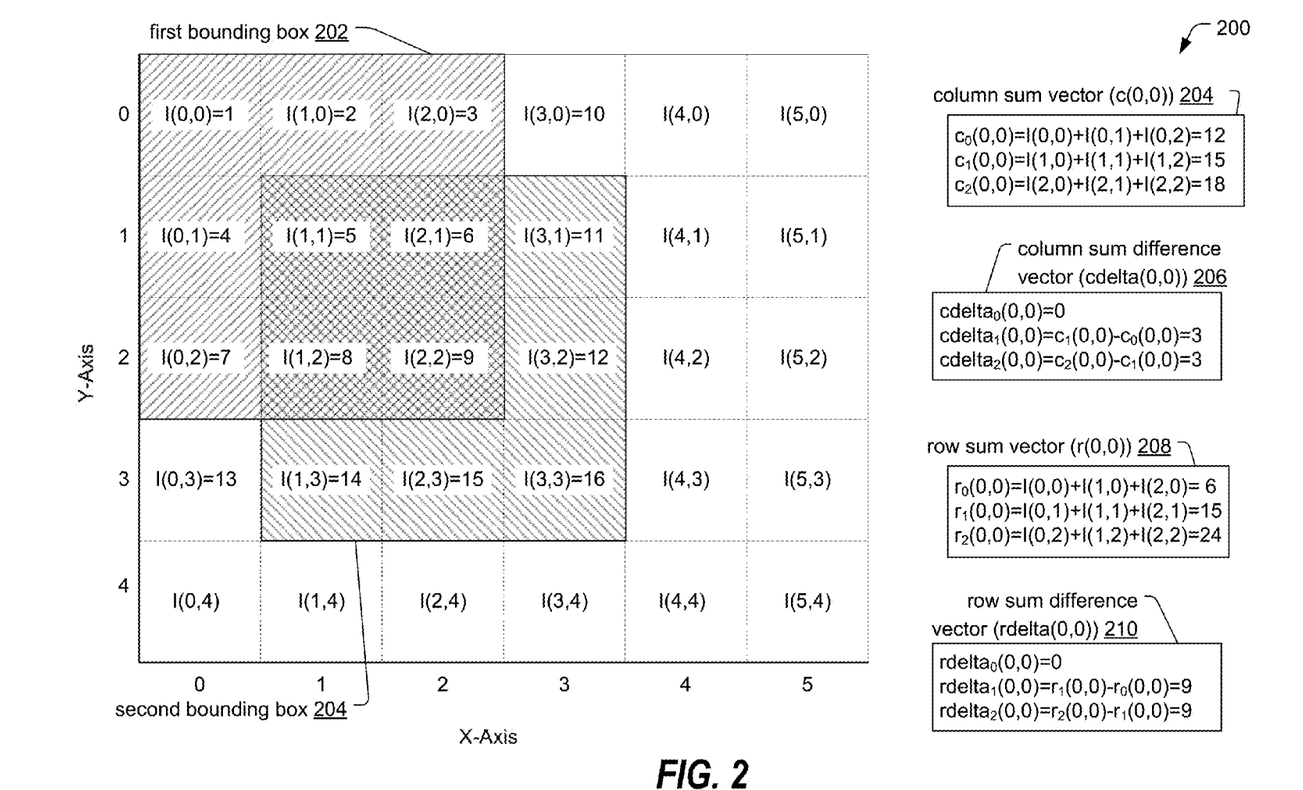
FIG. 2 is a diagram of a particular illustrative image that includes a tracked object.

In a particular embodiment, the stabilizer 102 may calculate a first column sum vector, a first column sum difference vector, a first row sum vector, and/or a first row sum difference vector of the first pixels of the first bounding box 116, as described with respect to FIG. 2. Similarly, the stabilizer 102 may also calculate a second column sum vector, a second column sum difference vector, a second row sum vector, and/or a second row sum difference vector of the candidate search pixels of the candidate search bounding box. The stabilizer 102 may store column sum vectors 132 (e.g., the first column sum vector and the second column sum vector), column sum difference vectors 134 (e.g., the first column sum difference vector and the second column sum difference vector), row sum vectors 136 (e.g., the first row sum vector and the second row sum vector), row sum difference vectors 138 (e.g., the first row sum difference vector and the second row sum difference vector), or a combination thereof, in the memory 120.

The stabilizer 102 may determine the particular similarity metric for the first pixels of the first bounding box 116 and the candidate search pixels of the candidate search bounding box by adding together a first SAD of the first column sum vector and the second column sum vector, a second SAD of the first column sum difference vector and the second column sum difference vector, a third SAD of a first row sum vector and the second row sum vector, and/or a fourth SAD of a first row sum difference vector and the second row sum difference vector. The stabilizer 102 may store similarity metrics 128 corresponding to each of the search bounding boxes in the memory 120.

The stabilizer 102 may select a particular search bounding box that includes search pixels that are most similar to the first pixels of the first bounding box 116. For example, the stabilizer 102 may select the particular search bounding box in response to determining that a corresponding similarity metric indicates a highest similarity with the first pixels (e.g., has a lowest value) of the similarity metrics 128.

The stabilizer 102 may determine a modified second bounding box based on the selected search bounding box. For example, the stabilizer 102 may generate modified second bounding box data 126. The modified second bounding box data 126 may indicate modified coordinates of a modified second bounding box. The modified coordinates may correspond to coordinates of the selected search bounding box. In a particular embodiment, the modified coordinates may be identical to the second coordinates of the second bounding box 118. Thus, the particular search bounding box may be selected from amongst multiple search (e.g., candidate) bounding boxes because the particular search bounding box is determined to be most similar to the first bounding box 116, thereby reducing visual jitter in bounding box placement between images in the sequence of images 104.

The modified second bounding box data 126 may indicate dimensions of the modified second bounding box. In a particular embodiment, the dimensions of the modified second bounding box may correspond to the first dimensions of the first bounding box 116 or the second dimensions of the second bounding box 118. In another embodiment, the dimensions of the modified second bounding box may correspond to median dimensions 140 corresponding to a plurality of images preceding the second image 108. The stabilizer 102 may use the median dimensions 140 as the dimensions of the modified second bounding box in response to determining that the number of the preceding images satisfies a threshold. The threshold number of preceding images may be a default value. The stabilizer 102 may send the modified second bounding box data 126 to the camera display. For example, the camera display may display the second image 108 with the modified second bounding box.

In a particular embodiment, the stabilizer 102 may store pixel characteristics corresponding to the modified second bounding box in anticipation of receiving an image subsequent to the second image 108 (e.g., a third image of the sequence of images 104). The modified second bounding box may correspond to the selected search bounding box when the modified dimensions of the modified second bounding box correspond to dimensions of the selected search bounding box (i.e., the first dimensions of the first bounding box 116). The stabilizer 102 may store the pixel characteristics of the selected search bounding box in response to determining that the modified dimensions of the modified second bounding box correspond to the dimensions of the selected search bounding box (or the first dimensions of the first bounding box 116).

In a particular embodiment, the modified dimensions of the modified second bounding box may be distinct from the dimensions of the selected search bounding box (or the first dimensions of the first bounding box 116). For example, the modified dimensions of the modified second bounding box may correspond to the second dimensions of the second bounding box 118 or to the median dimensions 140. When the dimensions of the modified second bounding box do not correspond to the dimensions of the selected search bounding box (or the first dimensions), the stabilizer 102 may generate and store pixel characteristics of the modified second bounding box. For example, the stabilizer 102 may generate a row sum vector, a row sum difference vector, a column sum vector, and/or a column sum difference vector, as described with reference to FIG. 2, corresponding to the modified second bounding box.

As additional images of the sequence of images 104 are received, additional bounding boxes may be selected based on similarity to previous bounding box(es). For example, the stabilizer 102 may receive the third image and may receive object tracking data 124 defining a third bounding box corresponding to the third image. The stabilizer 102 may determine a modified third bounding box based on the modified second bounding box and the third bounding box. For example, the stabilizer 102 may use stored pixel characteristics of the modified second bounding box to generate additional similarity metrics that can be used to determine the modified third bounding box.

Thus, the stabilizer 102 may select a particular bounding box from amongst multiple search (e.g., candidate) bounding boxes because the particular bounding box is determined to be most similar to a bounding box of a preceding image (e.g., the first image 106), thereby reducing visual jitter in boundary box placement between images in the sequence of images 104.

Referring to FIG. 2, a diagram of an illustrative image that includes a tracked object is disclosed and generally designated 200. In a particular embodiment, the image 200 may correspond to the first image 106 or the second image 108 of FIG. 1. The image 200 includes a plurality of columns (e.g., column 0-column 5) and a plurality of rows (e.g., row 0-row 4) of pixels. The image 200 may include a first bounding box 202 including a set of columns (e.g., column 0-column 2) and a set of rows (e.g., row 0-row 2) of pixels, which are illustrated as boxed pixels. In a particular embodiment, the boxed pixels may correspond to pixels of the first bounding box 116, pixels of one or more search bounding boxes, or both. A particular pixel may be identified by its coordinates (e.g., x, y coordinates). The image 200 indicates a particular pixel characteristic I of each pixel (x, y). In a particular embodiment, the pixel characteristic may correspond to pixel intensity. For example, I(0,0) may indicate the pixel intensity of the pixel at column 0 and row 0, and I(0, 1) may indicate the pixel intensity of the pixel at column 0 and row 1. In a particular embodiment, the image 200 may be a grayscale image.

The first bounding box 202 may be defined for the image 200. The pixel at (0, 0) defines a top-left corner of the first bounding box 202. Dimensions of the first bounding box 202 may include height of 3 pixels and width of 3 pixels. The stabilizer 102 may determine the bottom-right corner (e.g., (2, 2)) of the first bounding box 202 based on the coordinates of the top-left corner and the dimensions. In a particular embodiment, the first bounding box 202 may correspond to the first bounding box 116 of FIG. 1. In another embodiment, the first bounding box 202 may correspond to one or more of the search bounding boxes described with reference to FIG. 1.

The stabilizer 102 may determine a column sum vector c(x, y) of a bounding box. The coordinates of the top-left corner of the bounding box may correspond to (x, y). For example, the stabilizer 102 may determine a first column sum vector (c(0,0)) 204 of the boxed pixels of the first bounding box 202. In the example shown in FIG. 2, I(0,0)=1, I(1,0)=2, I(2,0)=3, I(3,0)=10, I(0,1)=4, I(1,1)=5, I(2,1)=6, I(3,1)=11, I(0,2)=7, I(1,2)=8, I(2,2)=9, I(3,2)=12, I(0,3)=13, I(1,3)=14, I(2,3)=15, and I(3,3)=16. Each element $c_j(0,0)$ of c(0,0) 204 may be equal to a sum of pixel values of column j of the first bounding box 202. Thus, for the example shown in FIG. 2, the values of $c_j(0,0)$ 204 are:

$c_0(0,0)=I(0,0)+I(0,1)+I(0,2)=12$, $c_1(0,0)=I(1,0)+I(1,1)+I(1,2)=15$, and $c_2(0,0)=I(2,0)+I(2,1)+I(2,2)=18$.

The stabilizer 102 may determine a column sum difference vector cdelta(0,0) 206 of the boxed pixels of the first bounding box 202. Each element $cdelta_j(0,0)$ of cdelta(0,0) 206 may be equal to $c_j(0,0)-c_{j-1}(0,0)$ for j>0 and may be equal to 0 for j=0. Thus, for the example shown in FIG. 2, the values of cdelta(0,0) 206 are:

$cdelta_0(0,0)=0$, $cdelta_1(0,0)=c_1(0,0)-c_0(0,0)=15-12=3$, and $cdelta_2(0,0)=c_2(0,0)-c_1(0,0)=18-15=3$.

The stabilizer 102 may determine a row sum vector r(0,0) 208 of the boxed pixels of the first bounding box 202. Each element $r_i(0,0)$ of r(0,0) 208 may be equal to a sum of pixel values of row i of the first bounding box 202. Thus, for the example shown in FIG. 2, values of r(0,0) 208 are:

$r_0(0,0)=I(0,0)+I(1,0)+I(2,0)=6$, $r_1(0,0)=I(0,1)+I(1,1)+I(2,1)=15$, and $r_2(0,0)=I(0,2)+I(1,2)+I(2,2)=24$.

The stabilizer 102 may determine a first row difference vector rdelta(0, 0) 210 of the boxed pixels of the first bounding box 202. Each element $rdelta_i(0,0)$ of rdelta(0,0) 210 may be equal to $r_i(0,0)-r_{i-1}(0,0)$ for i>0 and may be equal to 0 for i=0. Thus, for the example shown in FIG. 2, the values of rdelta(0,0) 210 are:

$rdelta_0(0,0)=0$, $rdelta_1(0,0)=r_1(0,0)-r_0(0,0)=15-6=9$, and $rdelta_2(0,0)=r_2(0,0)-r_1(0,0)=24-15=9$.

In a particular embodiment, the stabilizer 102 may generate an integral image corresponding to the image 200. The value of each particular pixel of the integral image is equal to a sum of pixel values of the particular pixel and of pixels above and to the left of the particular pixel. The value of the pixel (x, y) in the integral image Int may be denoted by Int(x,y). Int(x,y) may be determined by the formula Int(x, y)=I(x, y)+Int(x−1, y)+Int(x, y−1)−Int (x−1, y−1).

In the example shown in FIG. 2, the values of a subset of the pixels of the integral image are:

Int(0,0)=I(0,0)=1

Int(0,1)=I(0,1)+I(0,0)=5

Int(0,2)=I(0,2)+I(0,1)+I(0,0)=12

Int(0,3)=I(0,3)+I(0,2)+I(0,1)+I(0,0)=25

Int(1,0)=I(1,0)+I(0,0)=3

Int(1,1)=I(1,1)+I(0,1)+I(0,0)+I(1,0)=12

Int(1,2)=I(1,2)+I(1,1)+I(0,1)+I(0,0)+I(1,0)+I(0,2)=27

Int(1,3)=I(1,3)+I(1,2)+I(1,1)+I(0,1)+I(0,0)+I(1,0)+I(0,2)+I(0,3)=54

Int(2,0)=I(2,0)+I(1,0)+I(0,0)=6

Int(2,1)=I(2,1)+I(2,0)+I(1,0)+I(0,0)+I(1,1)+I(0,1)=21

Int(2,2)=I(2,2)+I(2,1)+I(2,0)+I(1,0)+I(0,0)+I(1,1)+I(0,1)+I(1,2)+I(0,2)=45

Int(2,3)=I(2,3)+I(2,2)+I(2,1)+I(2,0)+I(1,0)+I(0,0)+I(1,1)+I(0,1)+I(1,2)+I(0,2)+(0,3)+I(1,3)=87

Int(3,0)=I(3,0)+I(2,0)+I(1,0)+I(0,0)=16

Int(3,1)=I(3,1)+I(3,0)+I(2,1)+I(2,0)+I(1,0)+I(0,0)+I(1,1)+I(0,1)=42

Int(3,2)=I(3,2)+I(3,1)+I(3,0)+I(2,2)+I(2,1)+I(2,0)+I(1,0)+I(0,0)+I(1,1)+I(0,1)+I(1,2)+I(0,2)=78

Int(3,3)=I(3,3)+I(3,2)+I(3,1)+I(3,0)+I(2,3)+I(2,2)+I(2,1)+I(2,0)+I(1,0)+I(0,0)+I(1,1)+I(0,1)+I(1,2)+I(0,2)+(0,3)+I(1,3)=136

The stabilizer 102 may determine the values of c(0,0) 204 and r(0,0) 208 from the integral image. For example, a particular element of c(0,0) 204 may correspond to a difference of a first element of the integral image and a second element of the integral image, where the first element and the second element correspond to adjacent columns of the integral image. To illustrate, $c_0(0,0)$ corresponds to Int(0,2), $c_1(0,0)$ corresponds to Int(1,2)−Int(0,2), and $c_2(0,0)$ corresponds to Int(2,2)−Int(1,2).

In a particular embodiment, values of $c_i(x,0)$ of a bounding box (e.g., the first bounding box 202) with top-left coordinates (x,0) are:

$$c_i(x,0)=\text{Int}(0,\text{height}-1), \text{for } x+i=0, \text{ and}$$

$$c_i(x,0)=\text{Int}(x+i,\text{height}-1)-\text{Int}(x+i-1,\text{height}-1),$$
$$\text{for } x+i>0,$$

where height (e.g., 3) corresponds to a number of rows of the bounding box.

As another example, a particular element of r(0,0) 208 may correspond to a difference of a first element of the integral image and a second element of the integral image, where the first element and the second element correspond to adjacent rows of the integral image. To illustrate, $r_0(0,0)$ corresponds to Int(2,0), $r_1(0,0)$ corresponds to Int(2,1)–Int(2,0), and $r_2(0,0)$ corresponds to Int(2,2)–Int(2,1).

In a particular embodiment, values of $r_j(0,y)$ of a bounding box (e.g., the first bounding box 202) with top-left coordinates (0,y) are:

$$r_j(0,y)=\text{Int}(\text{width}-1,0), \text{for } y+j=0, \text{ and}$$

$$r_j(0,y)=\text{Int}(\text{width}-1,y+j)-\text{Int}(\text{width}-1,y+j-1), \text{for}$$
$$y+j>0,$$

where width (e.g., 3) corresponds to a number of columns of the bounding box.

As another example, the stabilizer 102 may determine a row sum vector r(1,1) and a column sum vector c(1,1) for a second bounding box 204 using the integral image. For example, a particular element of c(1,1) may correspond to a difference of a first element of the integral image and a second element of the integral image, where the first element and the second element correspond to adjacent columns of the integral image. To illustrate, $c_0(1,1)$ corresponds to Int(1,3)–Int(0,3)–Int(1,0)+Int(0,0), $c_1(1,1)$ corresponds to Int(2,3)–Int(1,3)–Int(2,0)+Int(1,0), and $c_2(1,1)$ corresponds to Int(3,3)–Int(2,3)–Int(3,0)+Int(2,0).

In a particular embodiment, values of $c_i(x,y)$ of a bounding box (e.g., the second bounding box 204) with top-left coordinates (x,y), where y>0 are:

$$c_i(x,y)=\text{Int}(0,y+\text{height}-1)-\text{Int}(0,y-1), \text{for } x+i=0, \text{ and}$$

$$c_i(x,y)=\text{Int}(x+i,y+\text{height}-1)-\text{Int}(x+i-1,y+\text{height}-1)-$$
$$\text{Int}(x+i,y-1)+\text{Int}(x+i-1,Y-1), \text{for } x+i>0,$$

where height (e.g., 3) corresponds to a number of rows of the bounding box.

As another example, a particular element of r(1,1) may correspond to a difference of a first element of the integral image and a second element of the integral image, where the first element and the second element correspond to adjacent rows of the integral image. To illustrate, $r_0(1,1)$ corresponds to Int(3,1)–Int(0,1)–Int(3,0)+Int(0,0), $r_1(1,1)$ corresponds to Int(3,2)–Int(0,2)–Int(3,1)+Int(0,1), and $r_2(1,1)$ corresponds to Int(3,3)–Int(0,3)–Int(3,2)+Int(0,2).

In a particular embodiment, values of $r_j(x,y)$ of a bounding box (e.g., the second bounding box 204) with top-left coordinates (x,y), where x>0 are:

$$r_j(x,y)=\text{Int}(x+\text{width}-1,0)-\text{Int}(x-1,0), \text{for } y+j=0, \text{ and}$$

$$r_j(x,y)=\text{Int}(x+\text{width}-1,y+j)-\text{Int}(x+\text{width}-1,y+j-1)-\text{Int}(x-1,y+j)+\text{Int}(x-1,y+j-1), \text{for } y+j>0,$$

where width (e.g., 3) corresponds to a number of columns of the bounding box.

In a particular embodiment, the stabilizer 102 may generate an integral image corresponding to the second image 108. Calculating row sum vectors and column sum vectors corresponding to each of the search bounding boxes from the integral image may be faster (e.g., computed in constant time) and may use fewer processing resources than calculating the vectors directly from the pixel values of the second image 108.

Figure 3:
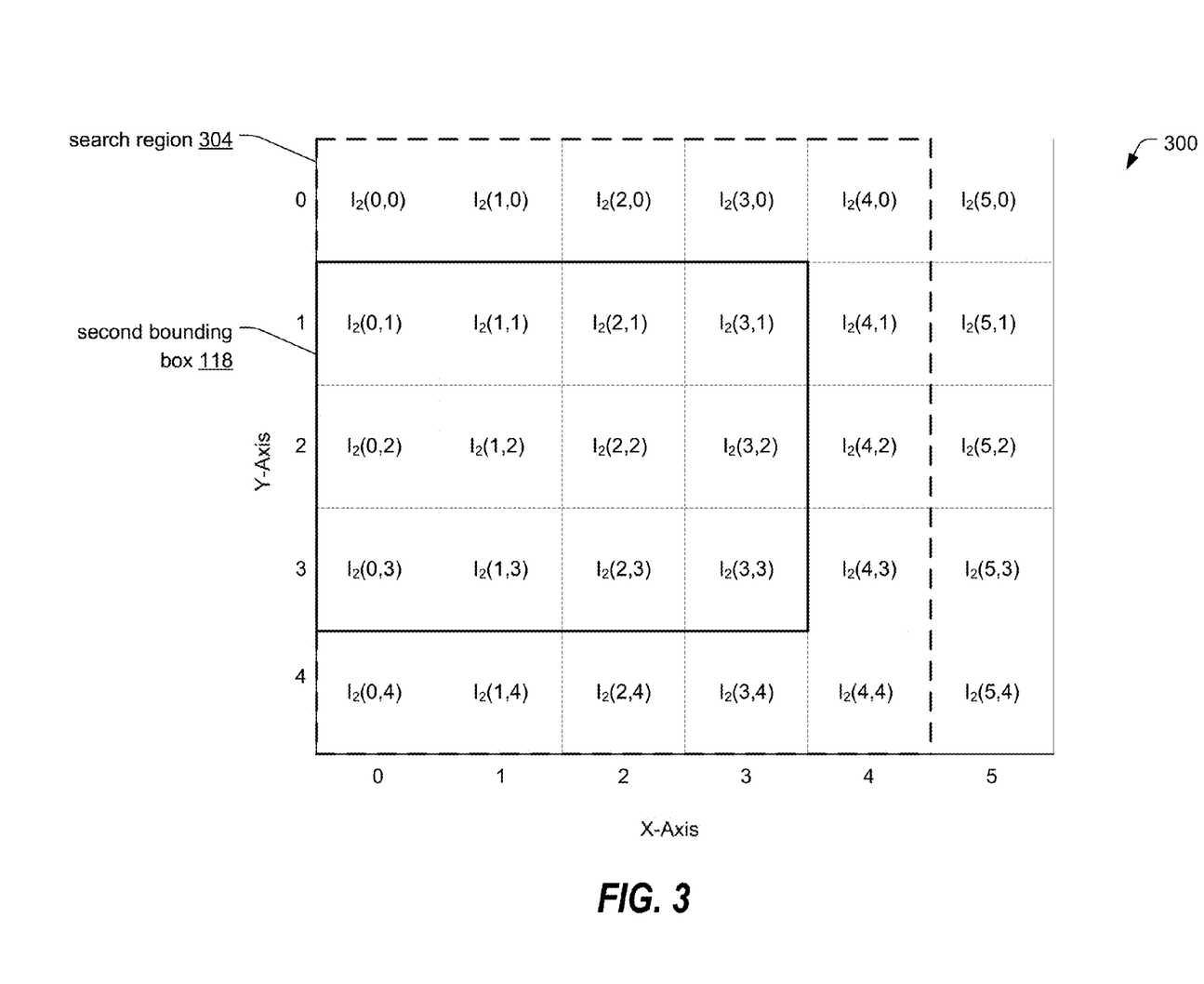
FIG. 3 is a diagram of another illustrative image that includes the tracked object of FIG. 2.

Referring to FIG. 3, a diagram of an illustrative image that includes the tracked object of FIG. 2 is disclosed and generally designated 300. The image 300 may correspond to the second image 108 of FIG. 1. The top-left coordinates (0, 1) and dimensions 4×3 (pixel width×pixel height) define the second bounding box 118 for the image 300. Each pixel value $I_2(x, y)$ may correspond to a pixel characteristic of the corresponding pixel (x, y) of the image 300. The subscript 2 indicates that the pixel characteristic corresponds to the second image 108.

The stabilizer 102 may determine a search region 304 based on the second bounding box 118. For example, the search region 304 may include the second bounding box 118 and additional pixels in one or more directions relative to the second bounding box 118. For example, stabilizer 102 may add up to a first number (e.g., 1) of pixels to the right and to the left of the second bounding box 118 and up to a second number (e.g., 1) of pixels to the top and to the bottom of the second bounding box 118 to generate the search region 304.

Figure 4:
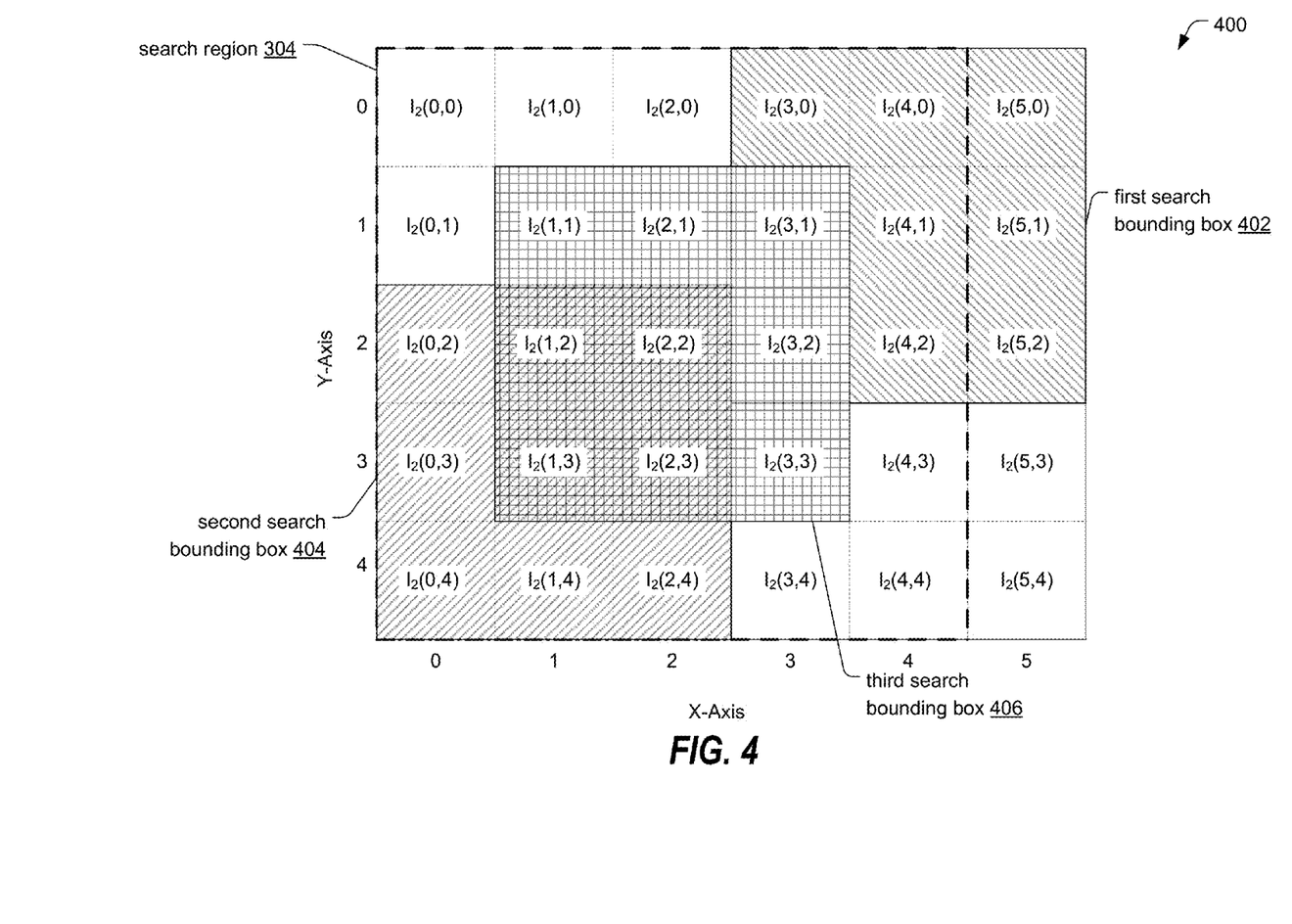
FIG. 4 is a diagram of another illustrative image that includes the tracked object of FIG. 2.

Referring to FIG. 4, a diagram of an illustrative image that includes the tracked object of FIG. 2 is disclosed and generally designated 400. The image 400 may correspond to the second image 108 of FIG. 1. The search region 304 may be defined for the image 400.

The stabilizer 102 may generate a plurality of search bounding boxes (e.g., a first search bounding box 402, a second search bounding box 404, and a third search bounding box 406) within the image 400 based on the search region 304. Dimensions of each of the search bounding boxes may be equal to the dimensions of the first bounding box 116. The stabilizer 102 may generate search bounding boxes with x-coordinates of a top-left pixel selected from a first range (e.g., 0-3) and y-coordinates of the top-left pixel selected from a second range (e.g., 0-2). The search region 304 may include pixels with x-coordinates outside the first range or y-coordinates outside the second range. However, the stabilizer 102 may refrain from generating search bounding boxes with top-left pixels having x-coordinates outside the first range, y-coordinates outside the second range, or both, because such search bounding boxes do not entirely fit within the image 400.

The stabilizer 102 may generate a search row sum vector, a search row sum difference vector, a search column sum vector, and/or a search column sum difference vector, as further described with reference to FIGS. 1-2, corresponding to each of the search bounding boxes 402-406. The stabilizer 102 may generate the similarity metrics 128 and may select a particular search bounding box as "most similar" to the first bounding box 116, as described with reference to FIG. 1. For example, the stabilizer 102 may select the second search bounding box 404 based on the similarity metric of the second search bounding box 404. Thus, the stabilizer 102 may generate the modified second bounding box data 126 to indicate that a modified bounding box displayed for the user 150 should have a top-left pixel at the location (0, 2).

In a particular embodiment, dimensions of the modified second bounding box may correspond to first dimensions of the first bounding box 116 of FIG. 1, second dimensions of the second bounding box 118 of FIG. 1, or the median dimensions 140 of FIG. 1. The modified second bounding box data 126 may indicate the coordinates (1,1) of the top-left pixel and the dimensions of the modified second bounding box. The stabilizer 102 may provide the modified second bounding box data 126 to a camera display. The camera display may display the second image 108 with the modified second bounding box. The modified second bounding box may correspond to a more stable bounding box than the second bounding box 118. For example, pixels corresponding to the modified second bounding box may be more similar to the first pixels of the first bounding box 116. As another example, dimensions of the modified second bounding box may correspond more closely to dimensions of a plurality of preceding images.

Figure 5:
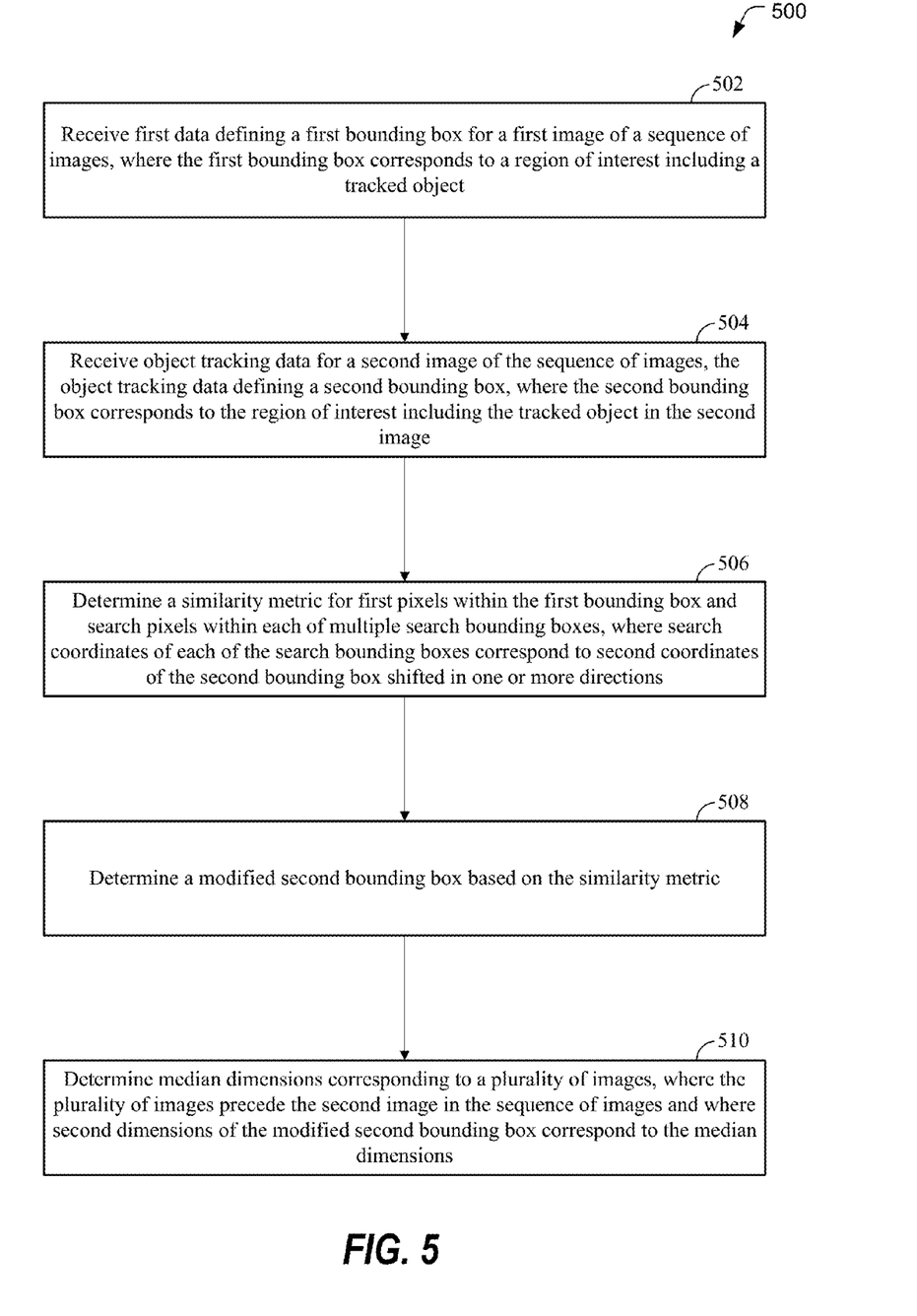
FIG. 5 is a flow chart of a particular illustrative embodiment of a method of stabilizing display of an object tracking box.

Referring to FIG. 5, a flow chart of a particular illustrative embodiment of a method of stabilizing display of an object tracking box is shown and generally designated 500. The method 500 may be performed by one or more components of the system 100 of FIG. 1.

The method 500 includes receiving first data defining a first bounding box for a first image of a sequence of images, at 502. The first bounding box may correspond to a region of interest including a tracked object. For example, the stabilizer 102 of FIG. 1 may receive the first data 122, as described with reference to FIG. 1. The first data 122 may define the first bounding box 116 for the first image 106 of the sequences of images 104. The first bounding box 116 may correspond to the region of interest 162 including the object 110.

The method 500 also includes receiving object tracking data for a second image of the sequence of images, at 504. The object tracking data may define a second bounding box. The second bounding box may correspond to the region of interest including the tracked object in the second image. For example, the stabilizer 102 of FIG. 1 may receive the object tracking data 124 for the second image 108, as described with reference to FIG. 1. The object tracking data 124 may define the second bounding box 118. The second bounding box 118 may correspond to the region of interest 162 including the object 110 in the second image 108.

The method 500 further includes determining a similarity metric for first pixels within the first bounding box and search pixels within each of multiple search bounding boxes, at 506. Search coordinates of each of the search bounding boxes may correspond to second coordinates of the second bounding box shifted in one or more directions. For example, the stabilizer 102 of FIG. 1 may determine a similarity metric for the first pixels within the first bounding box 116 and search pixels within each of multiple search bounding boxes, as described with reference to FIGS. 1-2 and 4.

The method 500 also includes determining a modified second bounding box based on the similarity metric, at 508. For example, the stabilizer 102 of FIG. 1 may determine a modified second bounding box based on the similarity metric, as described with reference to FIGS. 1 and 4.

The method 500 further includes determining median dimensions corresponding to a plurality of images, at 510. The plurality of images may precede the second image in the sequence of images. Second dimensions of the modified second bounding box may correspond to the median dimensions. For example, the stabilizer 102 of FIG. 1 may determine the median dimensions 140 corresponding to a plurality of images preceding the second image 108, as described with reference to FIG. 1. Second dimensions of the modified second bounding box may correspond to the median dimensions 140, as described with reference to FIGS. 1 and 4.

Thus, the method 500 includes selection of a particular bounding box from amongst multiple search (e.g., candidate) bounding boxes because the particular bounding box is determined to be most similar to a bounding box of a preceding image (e.g., the first image 106), thereby reducing visual jitter in boundary box placement between images in the sequence of images 104.

The method 500 of FIG. 5 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 500 of FIG. 5 can be performed by a processor that executes instructions, as described with respect to FIG. 7.

Figure 6:
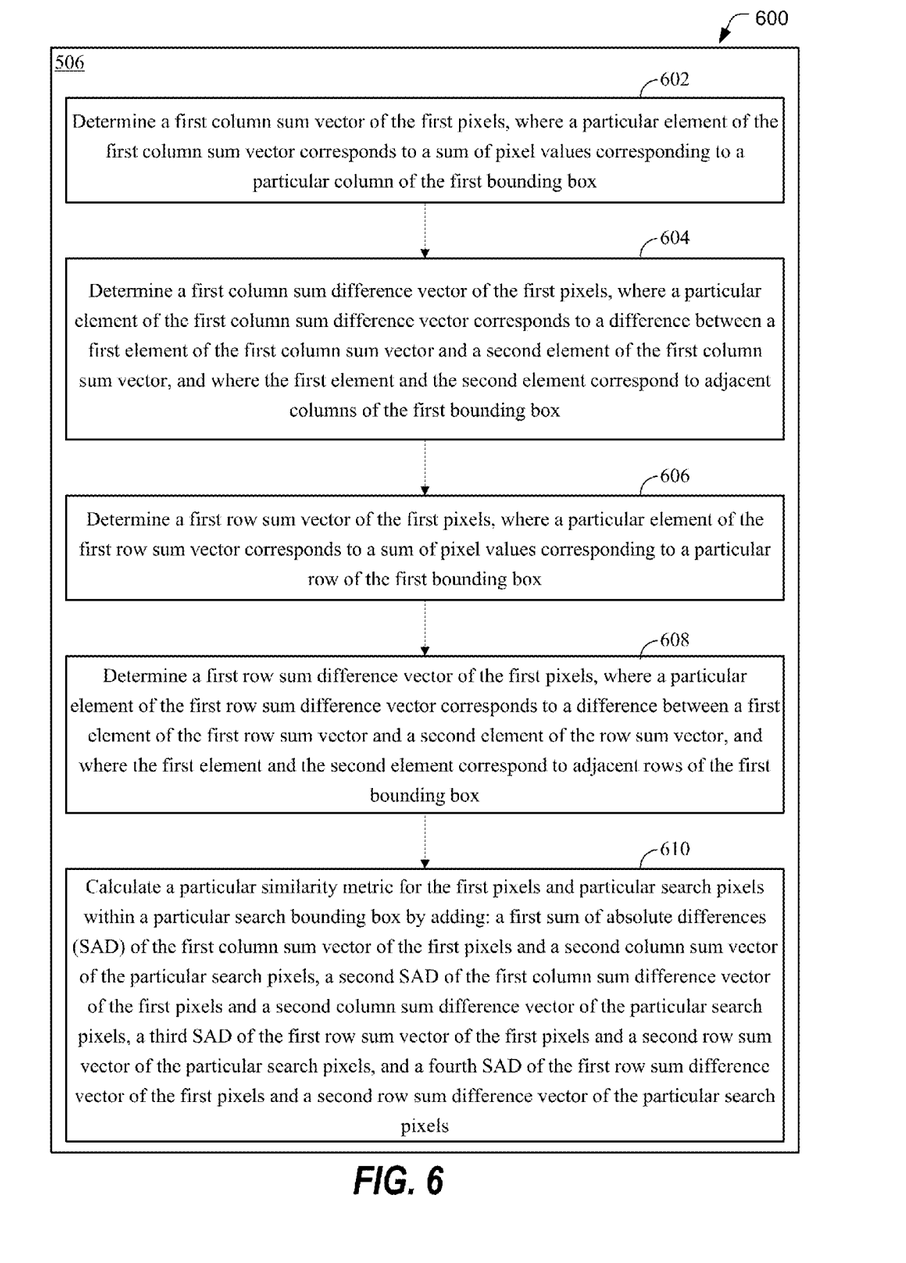
FIG. 6 is a flow chart of another illustrative embodiment of a method of stabilizing display of an object tracking box.

Referring to FIG. 6, a flow chart of a particular illustrative embodiment of a method of stabilizing display of an object tracking box is shown and generally designated 600. The method 600 may be performed by one or more components of the system 100 of FIG. 1. In a particular embodiment, the method 600 may correspond to the operation illustrated at step 506 of FIG. 5.

The method 600 includes determining a first column sum vector of the first pixels, at 602. For example, the stabilizer 102 of FIG. 1 may determine a first column sum vector of the first pixels of the first bounding box 116, as described with reference to FIGS. 1-2. A particular element of the first column sum vector may correspond to a sum of pixel values corresponding to a particular column of the first bounding box 116.

The method 600 also includes determining a first column sum difference vector of the first pixels, at 604. For example, the stabilizer 102 of FIG. 1 may determine a first column difference vector of the first pixels of the first bounding box 116, as described with reference to FIGS. 1-2. A particular element of the first column sum difference vector may correspond to a difference between a first element of the first column sum vector and a second element of the first column sum vector. The first element and the second element may correspond to adjacent columns of the first bounding box 116.

The method 600 further includes determining a first row sum vector of the first pixels, at 606. For example, the stabilizer 102 of FIG. 1 may determine a first row sum vector of the first pixels of the first bounding box 116, as described with reference to FIG. 1. A particular element of the first row sum vector may correspond to a sum of pixel values corresponding to a particular row of the first bounding box 116.

The method 600 also includes determining a first row sum difference vector of the first pixels, at 608. For example, the stabilizer 102 of FIG. 1 may determine a first row sum difference vector of the first pixels of the first bounding box 116, as described with reference to FIGS. 1-2. A particular element of the first row sum difference vector may correspond to a difference between a first element of the first row sum vector and a second element of the row sum vector. The first element and the second element may correspond to adjacent rows of the first bounding box 116.

The method 600 further includes calculating a particular similarity metric for the first pixels and particular search pixels within a particular search bounding box by adding: a first sum of absolute differences (SAD) of the first column sum vector of the first pixels and a second column sum vector of the particular search pixels, a second SAD of the first column sum difference vector of the first pixels and a second column sum difference vector of the particular search pixels, a third SAD of the first row sum vector of the first pixels and a second row sum vector of the particular search pixels, and a fourth SAD of the first row sum difference vector of the first pixels and a second row sum difference vector of the particular search pixels, at 610. For example, the stabilizer 102 of FIG. 1 may calculate a particular similarity metric for the first pixels of the first bounding box 116 and particular search pixels within a particular search bounding box, as described with reference to FIGS. 1-2 and 4.

It should be noted that although various embodiments are described as utilizing column sum vectors, column sum different vectors, row sum vectors, and row sum difference vectors, this is for example only and not to be considered limiting. In alternate embodiments, similarity may be determined based on fewer, more, or different computations and data structures.

The method 600 of FIG. 6 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 of FIG. 6 can be performed by a processor that executes instructions, as described with respect to FIG. 7.

Figure 7:
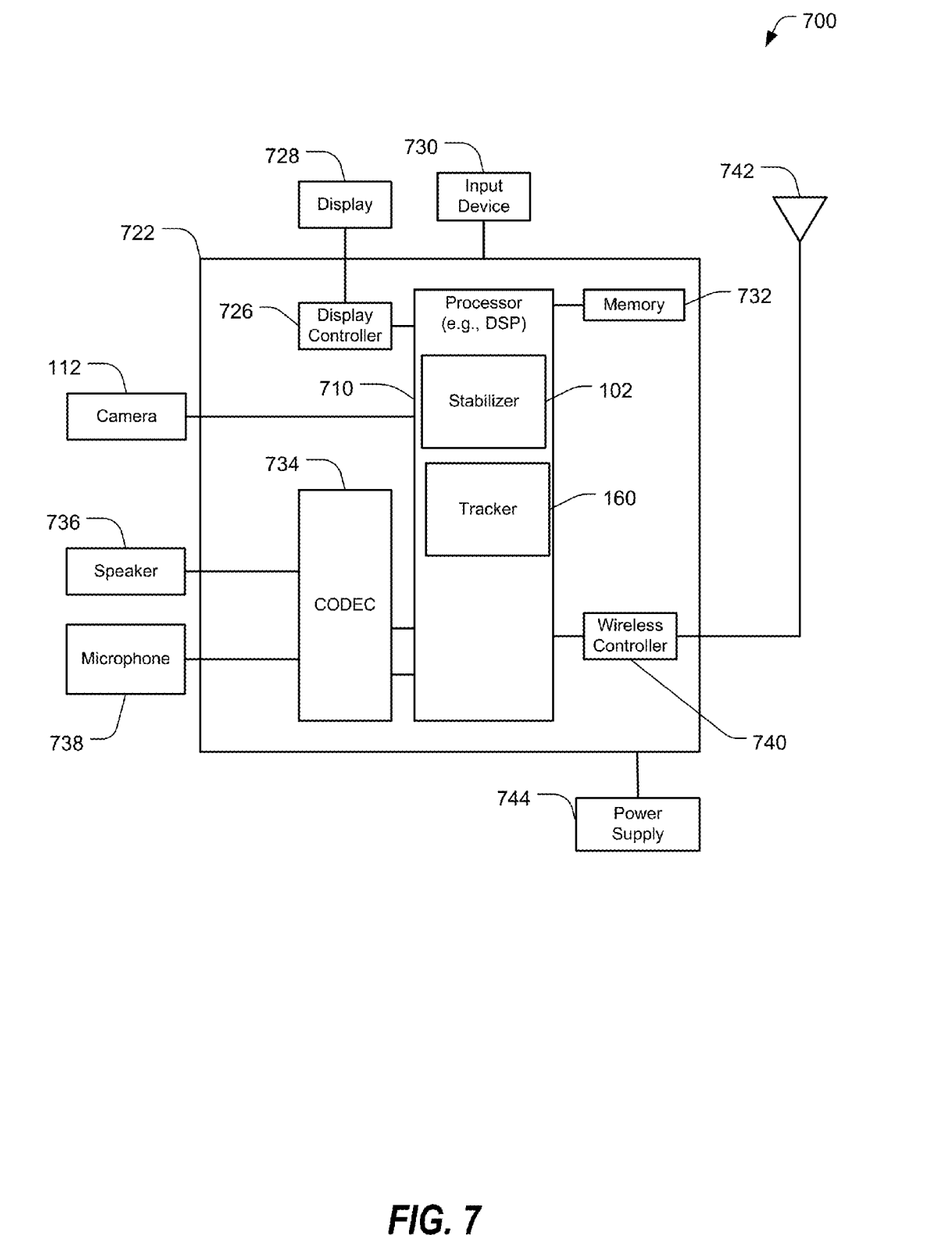
FIG. 7 is a block diagram of a device operable to stabilize display of an object tracking box in accordance with the systems and methods of FIGS. 1-6.

Referring to FIG. 7, a block diagram of a particular illustrative embodiment of a device (e.g., a wireless communication device) is depicted and generally designated 700. The device 700 includes a processor 710, such as a digital signal processor (DSP) or a central processing unit (CPU), coupled to a memory 732. The processor 710 may include and/or execute the stabilizer 102 of FIG. 1 and the tracker 160 of FIG. 1, or both.

One or more components of the device 700 may be implemented via dedicated hardware (e.g., circuitry), by a processor executing instructions to perform one or more tasks, or a combination thereof. As an example, the memory 732 or one or more components of the stabilizer 102 and/or the tracker 160 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions that, when executed by a computer (e.g., the processor 710), may cause the computer to perform at least a portion of the method 500 of FIG. 5, the method 600 of FIG. 6, or a combination thereof. As an example, the memory 732 or the one or more components of the stabilizer 102 may be a non-transitory computer-readable medium that includes instructions that, when executed by a computer (e.g., the processor 710), cause the computer perform at least a portion of the method 500 of FIG. 5, the method 600 of FIG. 6, or a combination thereof.

FIG. 7 also shows a display controller 726 that is coupled to the processor 710 and to a display 728. A camera, such as, the camera 112 of FIG. 1, may be coupled to the processor 710. A coder/decoder (CODEC) 734 can also be coupled to the processor 710. A speaker 736 and a microphone 738 can be coupled to the CODEC 734.

FIG. 7 also indicates that a wireless controller 740 can be coupled to the processor 710 and to a wireless antenna 742. In a particular embodiment, the processor 710, the display controller 726, the memory 732, the CODEC 734, and the wireless controller 740 are included in a system-in-package or system-on-chip device 722. In a particular embodiment, the camera 112, an input device 730 and a power supply 744 are coupled to the system-on-chip device 722. Moreover, in a particular embodiment, as illustrated in FIG. 7, the display 728, the camera 112, the stabilizer 102, the tracker 160, the input device 730, the speaker 736, the microphone 738, the wireless antenna 742, and the power supply 744 are external to the system-on-chip device 722. However, each of the display 728, the camera 112, the stabilizer 102, the tracker 160, the input device 730, the speaker 736, the microphone 738, the wireless antenna 742, and the power supply 744 can be coupled to a component of the system-on-chip device 722, such as an interface or a controller.

In conjunction with the described embodiments, a system is disclosed that includes means for receiving first data. The first data may define a first bounding box for a first image of a sequence of images. The first bounding box may correspond to a region of interest including a tracked object. The means for receiving may include the input device 730 of FIG. 7, one or more other devices or circuits configured to receive the data defining a bounding box (e.g., a touchscreen of a mobile phone), or any combination thereof.

The system may also include means for generating object tracking data. The object tracking data may correspond to a second image of the sequence of images. The object tracking data may define a second bounding box. The second bounding box may correspond to the region of interest including the tracked object in the second image. The means for generating may include the tracker 160 of FIG. 1 and FIG. 7, one or more other devices or circuits configured to generate object tracking data, or any combination thereof.

The system may further include means for determining a similarity metric and a modified second bounding box based on the similarity metric. The similarity metric may be determined for first pixels within the first bounding box and search pixels within each of multiple search bounding boxes. Search coordinates of each of the search bounding boxes may correspond to second coordinates of the second bounding box shifted in one or more directions. The means for determining may include the processor 710 of FIG. 7, the stabilizer 102 of FIGS. 1 and 7, one or more other devices or circuits configured to determine a similarity metric and a modified bounding box, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving first data defining a first bounding box for a first image of a sequence of images, the first bounding box corresponding to a region of interest and including a tracked object;
   receiving object tracking data for a second image of the sequence of images, the object tracking data defining a second bounding box, the second bounding box corresponding to the region of interest and including the tracked object in the second image;
   based on receiving the object tracking data for the second image and defining the second bounding box, determining a search region for the second image based on the second bounding box, the search region corresponding to a portion of the second image and including pixels within the second bounding box and pixels next to the second bounding box; and
   based on determining the search region for the second image, determining a plurality of similarity metrics based on multiple search bounding boxes corresponding to the search region, wherein the search region includes the multiple search bounding boxes, wherein each similarity metric of the plurality of similarity metrics is determined based on first pixels within the first bounding box and search pixels within a search bounding box, of the multiple search bounding boxes, that corresponds to the similarity metric, and wherein search coordinates of each of the multiple search bounding boxes are based on second coordinates of the second bounding box shifted in one or more directions; and
   determining a modified second bounding box based on the plurality of similarity metrics.

2. The method of claim 1, wherein the first data includes first coordinates and first dimensions of the first bounding box and wherein the object tracking data includes the second coordinates and second dimensions of the second bounding box.

3. The method of claim 2, wherein search dimensions of each of the multiple search bounding boxes correspond to the first dimensions of the first bounding box, and wherein the multiple search bounding boxes include the second bounding box.

4. The method of claim 1, wherein the plurality of similarity metrics includes a sum of absolute differences (SAD) metric, wherein the SAD metric is based on first values of the first pixels and second values of the search pixels, and wherein the first values and the second values identify, for a corresponding first pixel or a corresponding search pixel, a pixel intensity, a pixel color sub-component, or a combination thereof.

5. The method of claim 1, further comprising selecting a particular search bounding box of the multiple search bounding boxes to be the modified second bounding box based on a particular similarity metric of the plurality of similarity metrics, the particular similarity metric corresponding to the particular search bounding box.

6. The method of claim 5, further comprising calculating the particular similarity metric based at least in part on a sum of absolute differences (SAD) of first pixel characteristics corresponding to the first pixels and second pixel characteristics corresponding to particular search pixels within the particular search bounding box.

7. The method of claim 5, further comprising calculating the particular similarity metric by adding:
   a first sum of absolute differences (SAD) of a first column sum vector of the first pixels and a second column sum vector of particular search pixels within the particular search bounding box,
   a second SAD of a first column sum difference vector of the first pixels and a second column sum difference vector of the particular search pixels,
   a third SAD of a first row sum vector of the first pixels and a second row sum vector of the particular search pixels, and
   a fourth SAD of a first row sum difference vector of the first pixels and a second row sum difference vector of the particular search pixels.

8. The method of claim 1, further comprising determining a column sum vector of the first pixels, wherein a particular element of the column sum vector corresponds to a sum of pixel values corresponding to a particular column of the first bounding box.

9. The method of claim 8, further comprising determining a column sum difference vector of the first pixels, wherein a particular element of the column sum difference vector corresponds to a difference between a first element of the column sum vector and a second element of the column sum vector, and wherein the first element and the second element correspond to adjacent columns of the first bounding box.

10. The method of claim 1, further comprising determining a row sum vector of the first pixels, wherein a particular element of the row sum vector corresponds to a sum of pixel values corresponding to a particular row of the first bounding box.

11. The method of claim 10, further comprising determining a row sum difference vector of the first pixels, wherein a particular element of the row sum difference vector corresponds to a difference between a first element of the row sum vector and a second element of the row sum vector, and wherein the first element and the second element correspond to adjacent rows of the first bounding box.

12. The method of claim 1, further comprising determining median dimensions corresponding to a plurality of images, wherein the plurality of images precede the second image in the sequence of images and wherein second dimensions of the modified second bounding box correspond to the median dimensions.

13. An apparatus comprising:
a memory configured to store instructions;
a processor configured to execute the instructions to:
based on reception of object tracking data for a second image in a sequence of images that includes at least a first image and the second image, the object tracking data defining a second bounding box:
determine a search region for the second image based on the second bounding box, the search region corresponding to a portion of the second image and including pixels within the second bounding box and pixels next to the second bounding box;
determine a plurality of similarity metrics based on multiple search bounding boxes corresponding to the search region, wherein the search region includes the multiple search bounding boxes, wherein each similarity metric of the plurality of similarity metrics is determined based on first pixels within a first bounding box of the first image and search pixels within a search bounding box, of multiple search bounding boxes, that corresponds to the similarity metric, wherein the first bounding box corresponds to a region of interest and includes a tracked object, wherein search coordinates of each of the multiple search bounding boxes are based on second coordinates of the second bounding box shifted in one or more directions, wherein the first image precedes the second image in the sequence of images, and wherein the second bounding box corresponds to the region of interest and includes the tracked object in the second image; and
determine a modified second bounding box based on the plurality of similarity metrics; and
a display device configured to display the modified second bounding box.

14. The apparatus of claim 13, wherein the processor is further configured to select, based on a particular similarity metric of the plurality of similarity metrics, a particular search bounding box of the multiple search bounding boxes to be the modified second bounding box.

15. The apparatus of claim 14, wherein the processor is further configured to calculate the particular similarity metric based at least in part on a sum of absolute differences (SAD) of first pixel characteristics of the first pixels and second pixel characteristics of particular search pixels of the particular search bounding box.

16. The apparatus of claim 14, wherein the processor is further configured to calculate the particular similarity metric based at least in part on first pixel intensities of the first pixels and second pixel intensities of particular search pixels of the particular search bounding box.

17. The apparatus of claim 13, wherein the sequence of images corresponds to a video stream.

18. The apparatus of claim 13,
wherein the processor is further configured to obtain first data for the first image and to obtain object tracking data for the second image,
wherein the first data defines the first bounding box,
wherein the object tracking data defines the second bounding box,
wherein the first data includes first coordinates and first dimensions of the first bounding box,
wherein the object tracking data includes the second coordinates and second dimensions of the second bounding box, and
wherein the multiple search bounding boxes include the second bounding box.

19. The apparatus of claim 13, further comprising a camera configured to generate the first image and the second image.

20. The apparatus of claim 13, wherein search dimensions of each of the multiple search bounding boxes correspond to first dimensions of the first bounding box.

21. The apparatus of claim 13, wherein the processor is further configured to determine median dimensions corresponding to a plurality of images, wherein the plurality of images precedes the second image in the sequence of images, and wherein second dimensions of the modified second bounding box correspond to the median dimensions.

22. The apparatus of claim 21, further comprising a camera comprising a camera display, wherein the processor is further configured to:
in response to determining that a number of the plurality of images preceding the second image in the sequence of images satisfies a threshold, determine modified second bounding box data defining the second dimensions of the modified second bounding box based on the determined median dimensions; and
send the modified second bounding box data to the camera display, wherein the camera
display displays the second image with the modified second bounding box.

23. A computer-readable storage device storing instructions that, when executed by a processor, cause the processor to perform operations comprising:
based on reception of object tracking data for a second image in a sequence of images that includes at least a first image and the second image, the object tracking data defining a second bounding box:
determining a search region for the second image based on the second bounding box, the search region corresponding to a portion of the second image and including pixels within the second bounding box and pixels next to the second bounding box;
determining a plurality of similarity metrics based on multiple search bounding boxes corresponding to the search region, wherein the search region includes the multiple search bounding boxes, wherein each similarity metric of the plurality of similarity metrics is determined based on first pixels within a first bounding box of the first image and search pixels within a search bounding box, of multiple search bounding boxes, that corresponds to the similarity metric, wherein the first bounding box corresponds to a region of interest and includes a tracked object, wherein search coordinates of each of the multiple search bounding boxes are based on second coordinates of the second bounding box shifted in one or more directions, wherein the first image precedes the second image in the sequence of images, and wherein the second bounding box corresponds to the region of interest and includes the tracked object in the second image; and
determining a modified second bounding box based on the plurality of similarity metrics.

24. The computer-readable storage device of claim 23, wherein the operations further comprise determining median dimensions corresponding to a plurality of images, wherein the plurality of images precede the second image in the sequence of images, and wherein second dimensions of the modified second bounding box correspond to the median dimensions.

25. The computer-readable storage device of claim 23, wherein the operations further comprise:
   receiving first data for the first image, wherein the first data defines the first bounding box; and
   receiving object tracking data for the second image, wherein the object tracking data defines the second bounding box.

26. The computer-readable storage device of claim 25, wherein the first data includes first coordinates and first dimensions of the first bounding box, and wherein the object tracking data includes the second coordinates and second dimensions of the second bounding box.

27. The computer-readable storage device of claim 23, wherein search dimensions of each of the multiple search bounding boxes correspond to first dimensions of the first bounding box, and wherein the multiple search bounding boxes include the second bounding box.

28. The computer-readable storage device of claim 23, wherein the operations further comprise selecting a particular search bounding box of the multiple search bounding boxes to be the modified second bounding box based on a particular similarity metric, of the plurality of similarity metrics, that corresponds to the particular search bounding box.

29. An apparatus including:
   means for receiving first data defining a first bounding box for a first image of a sequence of images, wherein the first bounding box corresponds to a region of interest and includes a tracked object;
   means for generating object tracking data for a second image of the sequence of images, the object tracking data defining a second bounding box, wherein the second bounding box corresponds to the region of interest and includes the tracked object in the second image; and
   means for determining, based on receiving the object tracking data for the second image:
      a search region for the second image based on the second bounding box, the search region corresponding to a portion of the second image and including pixels within the second bounding box and pixels next to the second bounding box;
      a plurality of similarity metrics based on multiple search bounding boxes corresponding to the search region, wherein the search region includes the multiple search bounding boxes, wherein each similarity metric of the plurality of similarity metrics is determined based on first pixels within the first bounding box and search pixels within a search bounding box, of the multiple search bounding boxes, that corresponds to the similarity metric, and wherein search coordinates of each of the multiple search bounding boxes are based on second coordinates of the second bounding box shifted in one or more directions; and
      a modified second bounding box based on the plurality of similarity metrics.

30. The apparatus of claim 29, wherein the means for receiving, the means for generating, and the means for determining are integrated into at least one of a mobile phone, a set top box, a music player, a video player, an entertainment unit, a navigation device, a communications device, a personal digital assistant (PDA), a fixed location data unit, or a computer.

* * * * *